United States Patent
Hartwig et al.

(10) Patent No.: US 11,372,242 B2
(45) Date of Patent: Jun. 28, 2022

(54) HEAD-UP DISPLAY FOR A MOTOR VEHICLE

(71) Applicant: Bayerische Motoren Werke Aktiengesellschaft, Munich (DE)

(72) Inventors: Andre Hartwig, Munich (DE); Michael Arthur Janzer, Unterschleissheim (DE); Matthias Keller, Munich (DE); Eric Reum, Puchheim (DE); Mark Riebe, Kranzberg (DE); Florian Selig, Berg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 169 days.

(21) Appl. No.: 16/793,116

(22) Filed: Feb. 18, 2020

(65) Prior Publication Data

US 2020/0183160 A1 Jun. 11, 2020

Related U.S. Application Data

(63) Continuation of application No. PCT/EP2018/073833, filed on Sep. 5, 2018.

(30) Foreign Application Priority Data

Sep. 19, 2017 (DE) .................... 10 2017 216 524.3

(51) Int. Cl.
  *G02B 27/01* (2006.01)
  *B60K 35/00* (2006.01)
  *F21V 8/00* (2006.01)

(52) U.S. Cl.
  CPC .......... *G02B 27/0101* (2013.01); *B60K 35/00* (2013.01); *G02B 6/0026* (2013.01);
  (Continued)

(58) Field of Classification Search
  CPC ................ G02B 27/01; G02B 27/0101; G02B 27/0103; G02B 2027/0123; G02B 6/0026;
  (Continued)

(56) References Cited

U.S. PATENT DOCUMENTS

| 4,932,731 A | 6/1990 | Suzuki et al. |
| 9,715,110 B1 | 7/2017 | Brown et al. |
| 2015/0234477 A1 | 8/2015 | Abovitz et al. |
| 2018/0188533 A1 | 7/2018 | Ogiwara et al. |
| 2021/0405362 A1* | 12/2021 | Shi .................... G02B 27/30 |

FOREIGN PATENT DOCUMENTS

| DE | 102018221545 A1 * | 6/2020 | |
| FR | 2984532 A1 * | 6/2013 | ......... G02B 27/0101 |

(Continued)

OTHER PUBLICATIONS

International Search Report (PCT/ISA/210) issued in PCT Application No. PCT/EP2018/073833 dated Jan. 8, 2019 with English translation (six (6) pages).

(Continued)

*Primary Examiner* — Thomas A Hollweg
*Assistant Examiner* — Mary A El-Shammaa
(74) *Attorney, Agent, or Firm* — Crowell & Moring LLP

(57) ABSTRACT

A head-up display system for a motor vehicle includes a projection unit for providing a display image; a transparent holographic light guide display panel with a display surface in order to output a display image coupled into the display panel via a coupling-in region on a display surface, and a light guide which runs in a non-linear manner in order to guide a display image from the projection unit to the coupling-in region of the display panel.

15 Claims, 3 Drawing Sheets

(52) U.S. Cl.
CPC .... *G02B 6/0028* (2013.01); *B60K 2370/1529* (2019.05); *B60K 2370/166* (2019.05); *B60K 2370/167* (2019.05); *B60K 2370/29* (2019.05); *B60K 2370/336* (2019.05); *B60K 2370/66* (2019.05); *B60K 2370/736* (2019.05); *B60K 2370/771* (2019.05); *B60K 2370/774* (2019.05); *B60K 2370/779* (2019.05); *B60K 2370/788* (2019.05); *G02B 2027/0123* (2013.01)

(58) Field of Classification Search
CPC .......... G02B 6/0028; B60K 2370/1529; B60K 2370/167; B60K 2370/771; B60K 2370/77; B60K 2370/788; B60K 2370/166; B60K 2370/29; B60K 2370/336; B60K 2370/736; B60K 2370/774; B60K 2370/779; B60K 2370/66
See application file for complete search history.

(56) References Cited

FOREIGN PATENT DOCUMENTS

| GB | 2534151 A | 7/2016 |
|----|-----------|--------|
| WO | WO 01/09663 A1 | 2/2001 |
| WO | WO 2005/054929 A2 | 6/2005 |
| WO | WO 2016/208529 A1 | 12/2016 |

OTHER PUBLICATIONS

German-language Written Opinion (PCT/ISA/237) issued in PCT Application No. PCT/EP2018/073833 dated Jan. 8, 2019 (six (6) pages).

German-language Search Report issued in counterpart German Application No. 10 2017 216 524.3 dated Jun. 13, 2018 with partial English translation (14 pages).

* cited by examiner

HEAD-UP DISPLAY FOR A MOTOR VEHICLE

CROSS REFERENCE TO RELATED APPLICATIONS

This application is a continuation of PCT International Application No. PCT/EP2018/073833, filed Sep. 5, 2018, which claims priority under 35 U.S.C. § 119 from German Patent Application No. 10 2017 216 524.3, filed Sep. 19, 2017, the entire disclosures of which are herein expressly incorporated by reference.

BACKGROUND AND SUMMARY OF THE INVENTION

The invention relates to motor vehicles having head-up displays, in particular possibilities for arranging a display surface in the field of view of a driver of the motor vehicle.

Conventional head-up displays are currently provided with a reflective display surface via which the display image is reflected into the eye region of the driver by way of a projection device in the instrument panel. The projection device comprises for example an LED-backlit display unit, for example in the form of an LCD display unit, providing the display image that is to be imaged. Using a focusing optical unit, the display image is directed via the display surface in the direction of the driver in the form of a slightly diverging bundle of rays, and so the driver perceives a virtual display image on the opposite side of the display surface.

The display surface typically makes up only a relatively small portion of the field of view of the driver for representing essential vehicle and driving information. For realizing head-up displays for representing local or contact-analogous augmented-reality contents, it is necessary to significantly enlarge the display surface in the field of view of the driver. The projection devices necessary herefor, however, have large structural sizes that can be integrated in the instrument panel only with increased construction complexity. Moreover, the functions of the surrounding components can be significantly impaired owing to the limited installation space.

It is the object of the present invention to provide an improved head-up display for a motor vehicle that requires a minimal installation space that is as small as possible and where, in particular, installation in the instrument panel is not necessary.

This object is achieved by way of the head-up display for a motor vehicle according to the claimed invention.

According to a first aspect, a head-up display system for a motor vehicle is provided, comprising: a projection unit for providing a display image; a transparent holographic light-guide display panel for outputting a display image, which is coupled into the display panel via an input coupling region, on a display surface, and a light guide, which does not extend rectilinearly, for guiding a display image from the projection unit to the input coupling region of the display panel.

One embodiment of the aforementioned head-up display apparatus equips it with a holographic optical waveguide system, which is integrated in a transparent display panel located in the field of view of the driver. The transparent display panel is located in the field of view of the driver and is positioned in the horizontal direction thereto, that is to say a conventional viewing direction of the driver between the windshield and the eye region of the driver, and is held appropriately by the A pillar and/or the roof.

A projection unit serves for coupling a display image into the display panel. Such a projection unit is generally formed to be separate from the display panel and is arranged such that a display image can be coupled in substantially perpendicular to the display panel. The input coupling direction, which should deviate substantially only slightly from the surface normal of the display panel, generally limits the possibilities for arranging the projection unit outside the field of view of the driver. Consequently, the projection unit must conventionally be arranged for example in the region between the windshield and the display panel. For example, the projection unit can be mounted to the A pillar of the motor vehicle and protrude in the direction of the windshield to couple the display image into an input coupling region, which is located on the display panel next to a display surface.

Provision is made in accordance with the aforementioned display system to provide a light guide, having an optical fiber for each image point that is to be displayed, between the projection unit and the input coupling region of the display panel. The light guide is therefore made up of optical fibers, which are arranged in a matrix and extend parallel to one another, and has an input coupling end and an output coupling end. The display image is coupled into the input coupling end by way of the projection unit. The light guide can be curved and guide the coupled-in display image to the output coupling end of the light guide. The output coupling end of the light guide is arranged on the input coupling region of the display panel in a manner such that the image points that are coupled out of the optical fibers into the input coupling region of the display panel are correspondingly coupled into the display panel and displayed on the display surface of the display panel.

Owing to the possibility of selecting the light guide with different non-rectilinear profiles and lengths, it is possible to integrate the projection unit at a suitable site in the vehicle interior such that the projection unit is not perceived as a disturbing unit in the field of view of the driver. For example, the projection unit can be integrated into the A pillar, the instrument panel, the rear-view mirror, the roof and the like, and the connection to the display panel can be realized by guiding the light guide, in particular through the A pillar, to the input coupling region of the display panel.

The display panel can furthermore have, as the input coupling region, an input grating for coupling the display image in and for directing the display image onto a deflection grating, the deflection grating for directing the display image onto an output grating, and the output grating for coupling the display image out of the display panel.

The light guide can have a flexible and bendable design.

The light guide can furthermore have optical fibers, in particular arranged in a matrix, which guide the image points of the display image separately.

According to a further aspect, a motor vehicle having the aforementioned head-up display system is provided, wherein the projection unit is arranged on or in an instrument panel, an A pillar, a rear-view mirror, a center console or a roof.

In particular, the light guide can be guided through the A pillar from the projection unit to the input coupling region.

Provision can furthermore be made for the display panel to be arranged in a field of view of a driver in front of a windshield of the motor vehicle.

Furthermore, the outer edges of the display panel can be beveled such that the bevel extends in the viewing direction of the driver.

According to an embodiment, the display panel can comprise an input grating for coupling the display image in and for directing the display image onto a deflection grating, the deflection grating for directing the display image onto an output grating, and the output grating for coupling the display image out of the display panel, with the deflection grating being arranged between the output grating and an instrument panel of the motor vehicle.

Furthermore, the display panel can be inclined parallel to the windshield or, with respect to the vertical direction of the windshield, toward the driver such that the surface normal of the display panel and the viewing direction of the driver enclose an angle of no more than 50°, in particular no more than 30°, preferably no more than 20°.

In particular, the input coupling of the light guide into the display panel can be effected substantially horizontally or in the viewing direction of the driver of the motor vehicle.

According to an embodiment, a further head-up display system may be provided, wherein a projection unit is arranged in the instrument panel which projects a display image onto a combination surface of the windshield such that a further display image is directed into an eye region of the driver.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
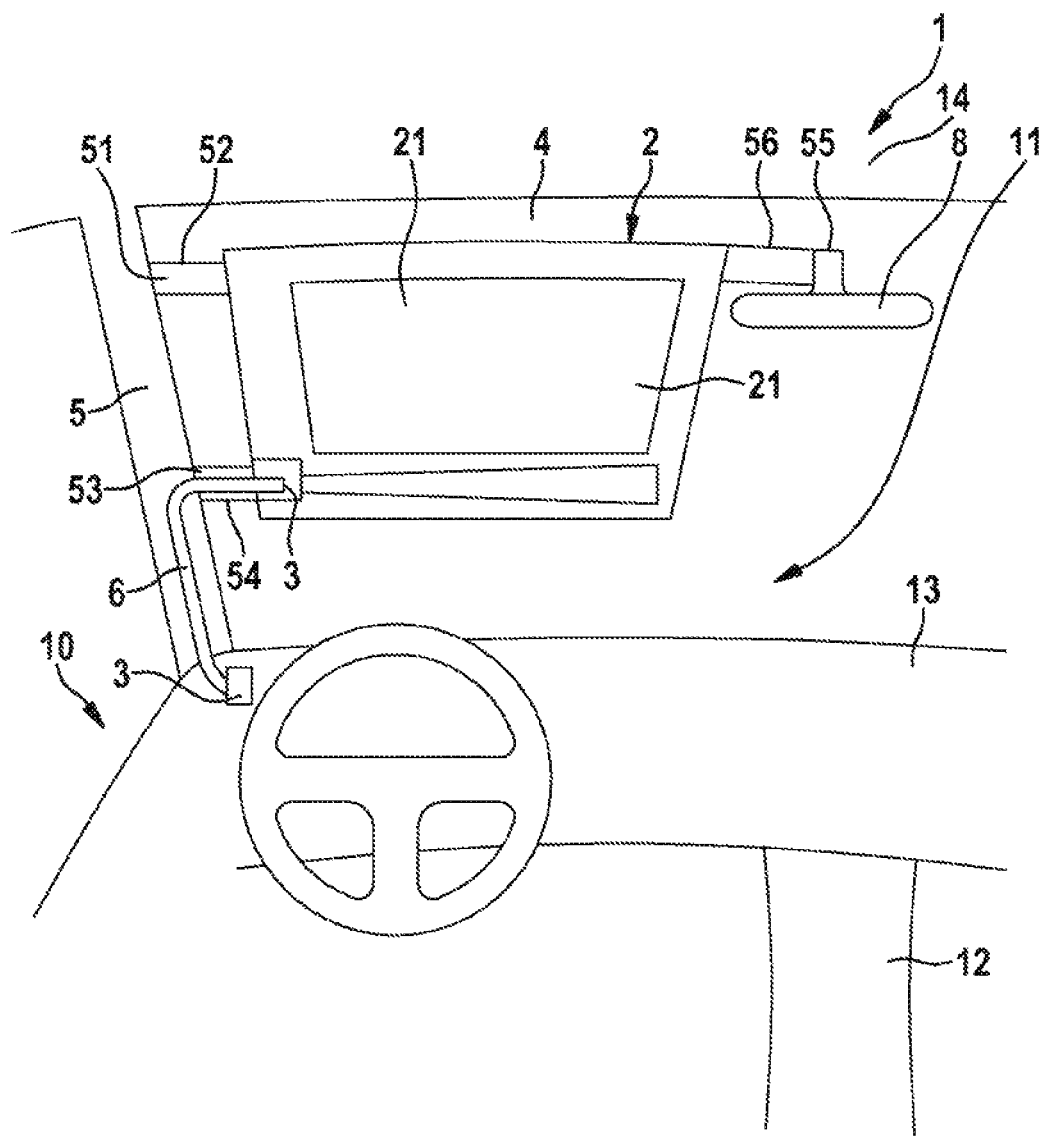
FIG. 1 is a schematic illustration of a plan view of an arrangement of a holographic light-guide display panel in the field of view of a driver of a motor vehicle in a vehicle interior.
Figure 2:
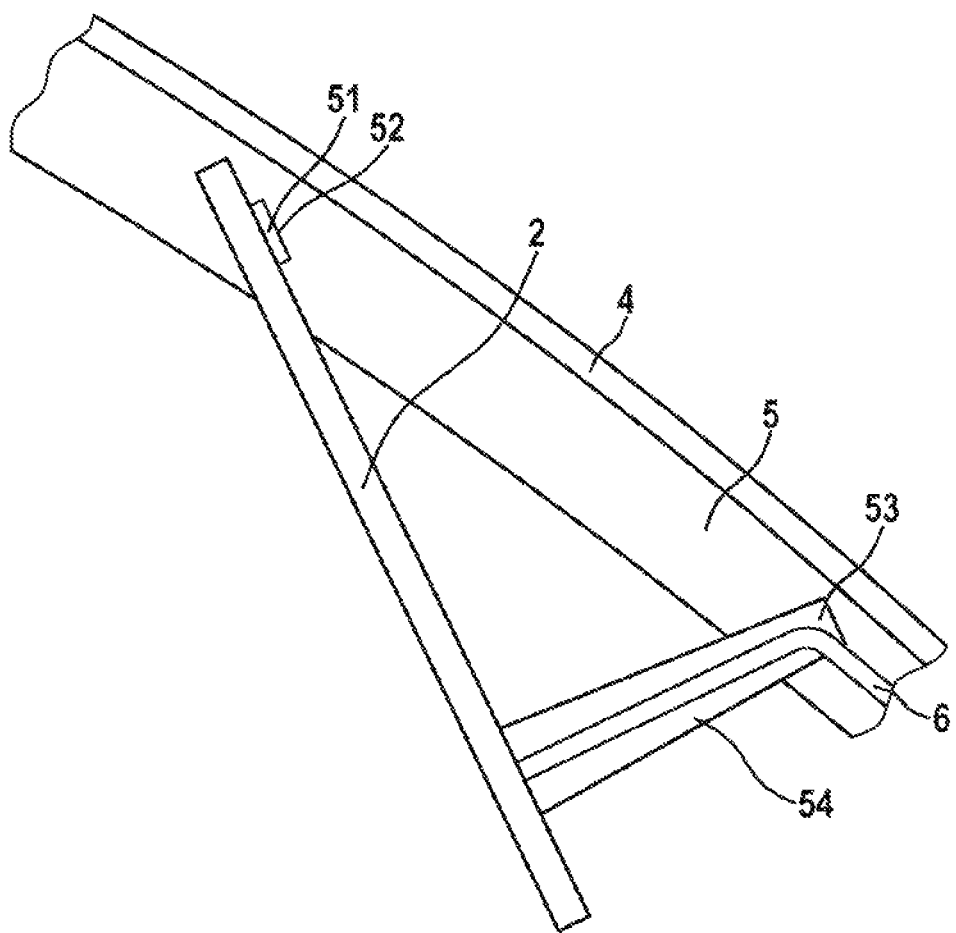
FIG. 2 is a schematic illustration of a cross-sectional side view of the arrangement of the holographic light-guide display panel in a vehicle interior.

FIGS. 1 and 2 show a plan view and a side view of a head-up display system 1 in an interior 11 of a motor vehicle 10. The display system 1 comprises a holographic light-guide display panel 2, which is coupled to a projection unit 3 such that a display image transmitted by the projection unit 3 is coupled into the display panel 2 and is displayed on a corresponding display surface 21 of the display panel 2.

The display panel 2 is arranged in a field of view of the driver in front of an upper part of a windshield 4 of the motor vehicle 10 such that a driver perceives the vehicle environment in front through the transparent display panel 2 when looking in a straight-ahead viewing direction that is determined by the seating position. The windshield 4 is arranged between two lateral A pillars 5, an instrument panel 13, and a roof 14.

The display panel 2 is able to represent the display image (bundle of rays representing the display image) transmitted by the projection unit 3 on the display surface 21 such that it is superposed on the perception of the vehicle environment.

The display panel 2 is appropriately fastened in front of the windshield 4. To this end, the display panel 2 in the exemplary embodiment shown can be fastened to a first retaining point 51 on the A pillar 5 of the motor vehicle 10 using a first retaining device 52. The display panel 2 can furthermore be fastened to a second retaining point 53 on the A pillar 5 using a second retaining device 54. A side of the display panel 2 that is located opposite the first and second retaining points 51, 53 can be attached to a third retaining point 55 using a third retaining device 56. The third retaining point 55 can be arranged, by way of an adhesively bonding surface, on the windshield 4, on a retaining point on the roof bow, or on a retaining point on a retaining base of a vehicle rear-view mirror 8, as illustrated in FIG. 1. The retaining devices 52, 54, 56 are arranged between the motor vehicle 10 and the display panel 2 and serve for retaining the display panel 2 in a fixed location in the motor vehicle 10.

With respect to the windshield 4, the display panel 2 can be inclined parallel to the orientation of the windshield 4 or, with respect to the vertical direction of the windshield 4, from the orientation of the windshield 4 toward the driver, such that the surface normal of the display panel 2 and the viewing direction of the driver enclose an angle of no more than 50°, in particular no more than 30°, preferably no more than 20°.

Figure 3:
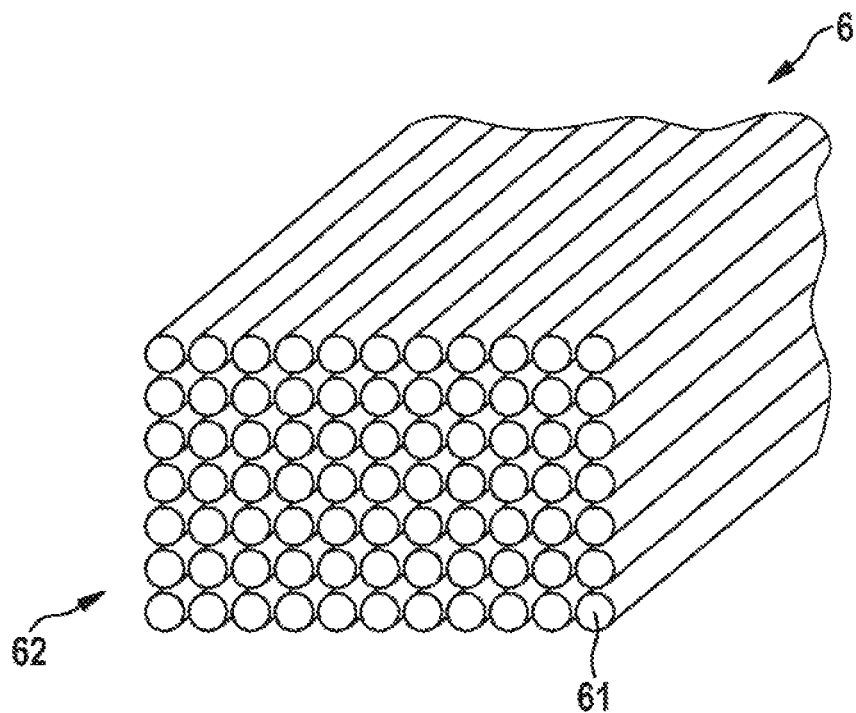
FIG. 3 is a schematic illustration of the construction of a light guide.

The projection unit 3 is coupled to the display panel 2 via a light guide 6, wherein the light guide 6 represents a bundle of optical fibers 61 which are assigned in each case one image point. As is illustrated in FIG. 3, the bundle of optical fibers 61 therefore has, in cross section, a matrix made of individual optical fibers 61, the arrangement of which preferably corresponds to the arrangement of the image points of the display image provided by the projection unit 3. The optical fibers 61 terminate together with a first termination surface 62 of the light guide 6, which is at a right angle with respect to the profile of the light guide 6. The first termination surface 62 is therefore coupled to the image outlet of the projection unit 3 such that the image points of the display image are in each case coupled into an optical fiber 61. Furthermore, a matrix made of microlenses (not illustrated) can be provided for the light guide between the projection unit 3 and the first termination surface 62 to couple the image points of the display image into the optical fibers in optimum fashion such that the individual beams assigned to each of the optical fibers are coupled into the display panel 2 as parallel as possible, i.e. such that they neither diverge nor converge. The optical fibers 61 can in each case have a diameter of between 1 μm and 100 μm and can be arranged adjacent to one another such that the possibility of bending the light guide 6 is maintained. Alternatively, the substantially non-rectilinear profile of the light guide 6 can be specified in advance such that it guides a bundle of rays representing the display image from the projection unit 3 to the display panel 2.

The length of the light guide 6 depends on the arrangement of the projection unit 3 in the vehicle interior 11. The projection unit 3 can be arranged in the vehicle interior 11 such that the view of the driver and of the remaining passengers is not impaired. In particular, the projection unit 3 can be arranged integrated in the instrument panel 13, in a center console 12, in the A pillar 5, in a roof 14, in the rear-view mirror 8 and the like.

The light guide 3 then guides the display image in particular in the interior of the vehicle components through the A pillar 5 to the second retaining region 53, is guided there out of the A pillar 5 and connected via a second termination surface to an input coupling region 22 of the display panel 2. The connection of the light guide 3 to the display panel 2 is realized by substantially right-angled placement of the second termination surface of the light guide 3 such that the light guide 6 terminates in front of the input coupling surface with a small air gap. The air gap is so small that no appreciable scattering of the coupled-out light from the optical fibers 61 occurs. Furthermore, a microlens matrix can be provided between the second termination surface of the light guide 3 and the input coupling region 22 of the display panel 2 to make possible optimum coupling of the display image into the input coupling region 22 of the display panel 2.

Since the display image is coupled out of the display panel 2 at the same angle as it is coupled into the input coupling region 22, provision can also be made for the display image to be coupled in using the optical fibers at an angle that differs from 90° and for a flexible connection of the light guide 3 to the display panel 2 to be provided therefor. If the display panel 2 is then tilted, the connection of the light guide 3 to the display panel 2 also tilts, such that the direction in which the display image is output substantially does not change due to a possible change in position of the display panel 2. This is beneficial in particular if contact-analogous display contents are presented by the display panel 2. In this way, the display image displayed on the display surface 21 continues to remain at the same position with respect to the environment despite external stimuli, such as bumps or potholes, which result in vibration or another movement of the display panel 2.

With respect to the windshield 4, the display panel 2 can be inclined parallel to the orientation of the windshield 4 or with respect to the vertical direction of the windshield 4 toward the driver, such that the surface normal of the display panel 2 and the viewing direction of the driver enclose an angle of no more than 50°, in particular no more than 30°, preferably no more than 20°. The second retaining device 54 can be provided with the light guide 6, wherein the light guide 6 guides the display image in the direction of the display panel 2 such that said display image can be coupled into the display panel 2. The second retaining device 54 can be formed separately from the light guide 6, or the light guide 6 can be guided in the interior of the retaining device 54. Alternatively, the light guide 6 can also be coupled fixedly to the display panel 2 such that it can serve as a second retaining device 54.

Figure 4:
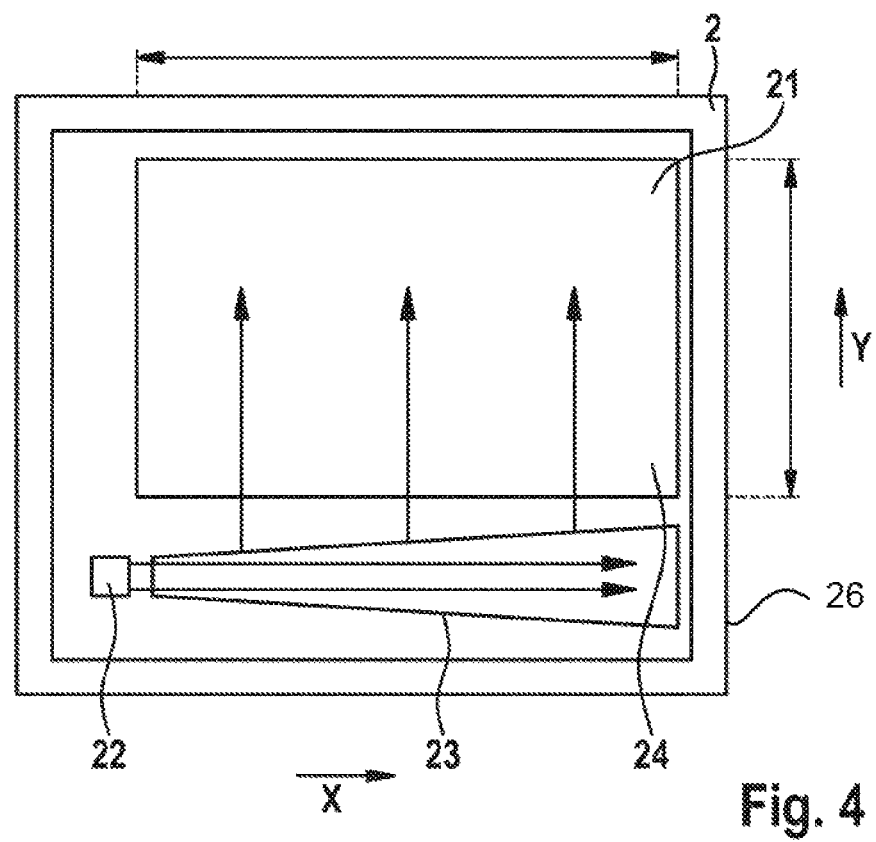
FIG. 4 is a schematic illustration of the setup of the display panel.

FIG. 4 illustrates a schematic illustration of a display panel 2 in more detail. The display panel 2 has a transparent design and comprises an input grating 22, via which the display image is coupled from the projection unit 3 into the display panel. The display image is preferably coupled in perpendicularly to the surface direction of the display panel 2. Alternatively, it can also be coupled in at an angle that deviates therefrom, wherein the direction of the input coupling also corresponds to the direction of the output coupling of the display image from the display surface 21.

The input grating 22 is configured to deflect the bundle of rays that represents the display image and is transmitted by the projection unit 3 in a manner such that the coupled-in light undergoes total internal reflection at the nearest glass-air interface of the display panel 2 and is steered in the surface direction through the display panel 2 in the direction of the deflection grating 23. The input grating 22 comprises for example a rectangular input coupling surface having dimensions of, for example, between 10×10 mm and 20×20 mm for accommodating the display image that is to be coupled in. The propagation direction of the light is deflected by way of the deflection grating 23 in the direction of an output grating 24 that is arranged in the region of the display surface 21. Since with each interaction of the light beam with the deflection grating 23 only some of the light beam is deflected, the light is distributed over the entire length of the deflection grating 23 within the display panel 2.

The output grating 24 then steers the light back into the original direction of the display image, such that it is coupled out of the display panel 2 at the original angle of incidence at which the display image is coupled into the display panel 2. The bundle of rays of the display image, which has already been distributed over the x-dimension by way of the deflection grating 23, is additionally distributed in the y-dimension via the output grating 24. The bundle of rays coupled into the display panel 2 is thereby distributed in the entire xy-dimension of the output grating 24. The size of the output grating 24 here corresponds to the dimensions required for the desired image size. If the driver of the motor vehicle 10 is looking onto the output grating 24 in the display panel 2, they will see the display image as a virtual image.

In particular, the optical system is designed such that the display image appears to be floating at an infinite distance.

Since the holographic grating structures in the display panel 2 are functional only for a specific wavelength range, the display of a multicolor or full-color image requires that a plurality of layers of such display panels 2 are arranged one above the other. These are then combined to form a display panel composite.

Input coupling is realized here via the input gratings 22, which are successively arranged in the direction of the center ray of the optical waveguide. In this case, in each case the wavelength for which a grating is optimized is coupled into said grating. The other wavelengths are transmitted.

The arrangement of the input grating 22 on the second retaining region 54 at the bottom left from the driver's view (left-hand drive) and a deflection grating 23 that extends along the lower edge of the display panel 2 or along the lower edge of the output grating 24 is advantageous. The configuration of the output grating 24, which is designed on the basis of the arrangement of the deflection grating 23, is designed for reflecting light coming substantially from the direction of the deflection grating 23, with the result that light from external light sources that is incident on the output grating typically from directions that are clearly different therefrom is not deflected in the direction of the driver.

In particular, incident sunlight can cause disturbing reflections that are extremely bright. With the selected arrangement of the deflection grating 23 below the output grating 24 with a corresponding alignment of the output grating 24 with the deflection grating 23, only light that is incident on the display panel 2 approximately from the direction of the instrument panel 13 will be potentially steered in the direction of the driver. As a result, direct reflections of the sun or of other external light sources are ruled out. The intensity of the light that is incident on the display panel 2 from the instrument panel 13 and can be deflected by the output grating 24 in the driver's direction, by contrast, is lower by some orders of magnitude.

The outer edges 26 of the display panel 2 are beveled such that the edges are located, if possible, along the sightline of the driver and can thus not further be perceived as disturbing visible edges.

The display system 1 can be combined with a conventional head-up display system. The light of a conventional head-up display system is here ideally not negatively affected by the transparent display panel 2. In particular, it is advantageous that the visual beam of the conventional head-up display system is completely covered by the display panel 2, i.e. that the display image of the conventional head-up display system extends through the transparent display panel 2. What is advantageous in such an arrangement is that the conventional head-up display system represents the virtual image approximately 2 to 3 m in front of the windshield 4 and can in that case be preferably used for conventional non-augmented-reality functions, such as status displays of the motor vehicle, for example speed, navigation displays, traffic information, and the like.

The holographic light-guide display system, by contrast, can represent the virtual image at a quasi infinite projection distance and can thus inject augmented-reality information, which is represented contact-analogously to objects of the vehicle environment, into the vehicle environment that is perceived by the driver.

In particular, the display panel 2 can have a removable design so as to allow cleaning of the display panel 2 on the driver-remote side of the windshield portion that is located therebehind.

On account of the above-described holographic light-guide display system, no installation space is required in the instrument panel. Furthermore, it is possible with the arrangements shown in the depiction to achieve image sizes that cover 25°×5° of the field of view of the driver, which makes possible complete covering of adjacent driving lanes with an augmented-reality head-up display image.

LIST OF REFERENCE SIGNS 6 head-up display system
2 holographic light-guide display panel
21 display surface
22 input grating
23 deflection grating
24 output grating
26 outer edges
3 projection unit
4 windshield
5 A pillar
6 light guide
51 first retaining region
52 first retaining device
53 second retaining region
54 second retaining device
55 third retaining region
56 third retaining device
8 vehicle rear-view mirror
10 motor vehicle
11 interior
12 center console
13 instrument panel
14 roof The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A head-up display system for a motor vehicle, comprising:
   a projection unit for providing a display image;
   a transparent holographic light-guide display panel having a display surface for outputting a display image, which display image is coupled into the display panel via an input coupling region, on a display surface; and
   a light guide, which does not extend rectilinearly, for guiding the display image from the projection unit to the input coupling region of the display panel, wherein:
   the light guide has optical fibers arranged in a matrix, which guide image points of the display image separately, and
   an output coupling end of the light guide is arranged on the input coupling region of the display panel.

2. The head-up display system according to claim 1, wherein
   the display panel comprises an input grating, a deflection grating and an output grating, wherein
   as the input coupling region, the input grating couples the display image in and directs the display image onto the deflection grating,
   the deflection grating directs the display image onto the output grating, and
   the output grating couples the display image out of the display panel.

3. The head-up display system according to claim 1, wherein
   the light guide has a flexible design.

4. A motor vehicle, comprising:
   a head-up display system according to claim 1, and
   an instrument panel, an A pillar, a rear-view mirror, a center console, and a roof, wherein
   the projection unit is arranged on or in the instrument panel, the A pillar, the rear-view mirror, the center console, or the roof.

5. The motor vehicle according to claim 4, wherein
   the projection unit is arranged on or in the instrument panel, and
   the light guide is guided through the A pillar from the projection unit to the input coupling region.

6. The motor vehicle according to claim 4, wherein
   the display panel is arranged in a field of view of a driver in front of a windshield of the motor vehicle.

7. The motor vehicle according to claim 4, wherein
   outer edges of the display panel are beveled, with the bevel extending in the viewing direction of the driver.

8. The motor vehicle according to claim 4, wherein
   the display panel comprises an input grating, a deflection grating and an output grating, wherein
   the input grating couples the display image in and directs the display image onto the deflection grating,
   the deflection grating directs the display image onto the output grating, and
   the output grating couples the display image out of the display panel, with the deflection grating being arranged between the output grating and an instrument panel of the motor vehicle.

9. The motor vehicle according to claim 4, wherein
   the display panel is inclined parallel to the windshield or, with respect to the vertical direction of the windshield, toward the driver such that a surface normal of the display panel and the viewing direction of the driver enclose an angle of no more than 50°.

10. The motor vehicle according to claim 9, wherein
    the angle is no more than 30°.

11. The motor vehicle according to claim 9, wherein the angle is no more than 20°.

12. The motor vehicle according to claim 9, wherein the input coupling of the light guide into the display panel is effected substantially horizontally or in the direction of a viewing plane of the driver.

13. The motor vehicle according to claim 4, further comprising:
 a second head-up display system, wherein a second projection unit is arranged in the instrument panel which projects a further display image onto a combination surface of the windshield such that the further display image is directed into an eye region of the driver.

14. The motor vehicle according to claim 13, wherein the further display image extends through the transparent holographic light-guide display panel.

15. A motor vehicle, comprising:
 a head-up display system according to claim 1, and
 an A pillar, wherein
 the light guide is guided through the A pillar from the projection unit to the input coupling region.

\* \* \* \* \*